United States Patent [19]

Schuster et al.

[11] 4,180,474

[45] Dec. 25, 1979

[54] RADIATION-HARDENABLE DILUENTS FOR RADIATION-HARDENABLE COMPOSITIONS

[75] Inventors: Karl-Ernst Schuster, Kerken; Hans J. Rosenkranz, Krefeld; Karl Furh, Krefeld; Hans Rüdolph, Krefeld, all of Fed. Rep. of Germany

[73] Assignee: Bayer Aktiengesellschaft, Fed. Rep. of Germany

[21] Appl. No.: 849,089

[22] Filed: Nov. 7, 1977

[30] Foreign Application Priority Data

Nov. 11, 1976 [DE] Fed. Rep. of Germany ....... 2651507

[51] Int. Cl.$^2$ ........................... C09K 3/00; G03C 1/68
[52] U.S. Cl. ........................... 252/188.3 R; 204/159.14; 204/159.19; 204/159.22; 204/159.23; 430/288
[58] Field of Search ........................ 96/115 R, 115 P; 252/188.3 R; 260/837 R, 859 R, 861

[56] References Cited

U.S. PATENT DOCUMENTS 3,457,178  7/1969  Hovey et al. ................. 252/188.3 R
3,725,355  4/1973  Parrish et al. ................. 252/188.3 R Primary Examiner—Leland A. Sebastian
Attorney, Agent, or Firm—Connolly and Hutz

[57] ABSTRACT

Radiation-crosslinkable diluents for radiation-hardenable compositions (binders) consisting of a mixture of triacrylates of a reaction product of trimethylol propane and ethylene oxide with an average degree of ethoxylation of from 2.5 to 4, the ethoxylated trimethylol propane being substantially free from trimethylol propane and having the following distribution:

4 to 5% by weight of monoethoxylation product
14 to 16% by weight of diethoxylation product
20 to 30% by weight of triethoxylation product
20 to 30% by weight of tetraethoxylation product
16 to 18% by weight of pentaethoxylation product.
6 to 8% by weight of hexaethoxylation product.

The diluents effectively reduce the viscosity of radiation-hardenable compositions and do not have any adverse effect upon their reactivity or upon the properties of the resulting hardened products.

5 Claims, No Drawings

RADIATION-HARDENABLE DILUENTS FOR RADIATION-HARDENABLE COMPOSITIONS

This invention relates to radiation-hardenable diluents based on polyfunctional acrylic acid esters of ethoxylated trimethylol propane and having an average degree of ethoxylation of from 2.5 to 4.

Radiation-hardenable coating compositions are well known in the art. On account of the restrictions on solvent content in the atmosphere, increasing efforts have been made to provide 100% polymerisable systems which do not contain any volatile components, but instead consist of constituents which form either the whole or a part of the hardened film itself. Monomers of this type are known, examples being acrylic acid esters of 1,4-butane diol, 1,6-hexane diol, diethylene glycol, trimethylol propane, pentaerythritol or glycerol.

The proportion of these comonomeric acrylic acid esters in the binders naturally influences all the parameters (for example reactivity, viscosity and hardness, adhesion, elasticity of the hardened films). For example, it is known that hexane diol bis acrylate very effectively reduces the viscosity of a resin, but at the same time has an extremely adverse effect upon the reactivity of the binder. On the other hand, it is known that trimethylol propane triacrylate has only a slight effect upon the reactivity of a binder, but is unable sufficiently to reduce the viscosity and at the same time imparts greater hardness but also poorer adhesion to the film on account of the relatively high crosslinking density.

It is also known that triacrylates can be produced from the reaction products of trimethylol propane and 1 to 20 moles of ethylene oxide and that they may be used for photopolymerisation reactions (cf. U.S. Pat. No. 3,368,900, column 2, lines 24 to 26). Polyfunctional acrylates of reaction products of trimethylol propane with ethylene oxide having a degree of ethoxylation of two or more are also described by the general formula in U.S. Pat. No. 3,380,831 (column 3, lines 18 to 38), although the subject of this Patent is products having a degree of ethoxylation of from 6 to 500. The degree of ethoxylation indicates the average number of moles of ethylene oxide that has been added to 1 mole of trimethylol propane. The advantage of the polyacrylates of alkoxylated polyols having a degree of alkoxylation of more than 6 is said to lie in their high compatibility with the macromolecular thermoplasts used, in their physiological acceptability, in the low take-up of oxygen, in their miscibility with water and in their liquid aggregate condition.

The object of the present invention is to provide radiation-hardenable diluents for radiation-hardenable binders which effectively reduce the viscosity of the radiation-hardenable binder, but which do not have any adverse effect upon their reactivity or upon the properties of the resulting hardened products.

According to the invention, this object is achieved by using as diluents triacrylic acid esters of ethoxylated trimethylol propane having an average degree of ethoxylation of from 2.5 to 4 and as high as possible a content of triacrylic acid esters of ethoxylated trimethylol propane having a degree of ethoxylation of 3.

Accordingly, the present invention provides radiation-hardenable diluents for radiation-hardenable compositions (binders) based on acrylic acid esters of reaction products of trimethylol propane and alkylene oxide, characterised by the fact that the radiation-hardenable diluent consists of a mixture of triacrylates of a reaction product of trimethylol propane and ethylene oxide having an average degree of ethoxylation of from 2.5 to 4, preferably from 3 to 4, the ethoxylated trimethylol propane being substantially free from trimethylol propane and having the following distribution:

4 to 5% by weight of monoethoxylation product;
14 to 16% by weight of diethoxylation product;
20 to 30% by weight of triethoxylation product;
20 to 30% by weight of tetraethoxylation product;
16 to 18% by weight of pentaethoxylation product; and
6 to 8% by weight of hexaethoxylation product.

The ethoxylation products are produced by known methods and represent commercial mixtures (cf. High Polymers, Vol.VIII, Polyether Part I, Interscience Publishers (1963); Methoden der organischen Chemie, Houben-Weyl (1963), Vol. 14/2, page 437).

The acrylic acid esters of the ethoxylation products are also produced by known methods, for example by direct esterification with acrylic acid or by azeotropic esterification with benzene, toluene or petrol as a water entraining agent in the presence of suitable catalysts and stabilisers. They may also be produced by transesterifying acrylic acid esters in the presence of suitable catalysts (cf. U.S. Pat. Nos. 2,101,107 and 2,468,094).

The diluents according to the present invention effectively reduce the viscosity of viscous, radiation-hardenable resins. The diluents have no adverse effect upon the reactivity of reactive resins, whereas they increase the reactivity of systems less sensitive to radiation. The properties of the hardened products resulting from the radiation-hardenable system, such as their hardness, elasticity and adhesion, are also only affected to a negligible extent by the diluents according to the invention. Compared with the triacrylate of trimethylol propane and the triacrylate of ethoxylated trimethylol propane (degree of ethoxylation 6 and higher), the triacrylates of ethoxylated trimethylol propane having a degree of ethoxylation of from 2.5 to 4 have a distinctly lower viscosity and an increased reactivity. They have the advantage over the 1,6-hexane diol diacrylate conventionally used as diluent that they do not reduce the reactivity of the system.

The radiation-hardenable compositions comprising diluents according to the invention may be hardened by means of high-energy radiation, such as UV-light, electron beams, gamma rays etc., preferably by UV-light.

In cases where polymerisation is carried out with UV-light, the photoinitiator used may be any one of the compounds normally used for this purpose, for example benzophenone and, quite generally, aromatic keto compounds derived from benzophenone, such as alkyl benzophenones, halogen-methylated benzophenones according to German Offenlegungsschrift No. 1,949,010, Michler's ketone, anthrone, halogenated benzophenones. It is also possible to use benzoin and its derivatives, for example according to German Offenlegungsschrifts Nos. 1,769,168; 1,769,853; 1,769,854; 1,807,297; 1,807,301; 1,919,678 and 2,430,081 and German Auslegeschrift No. 1,694,149. Other effective photoinitiators are anthraquinone and many of its derivatives, for example $\beta$-methyl anthraquinone, tert.-butyl anthraquinone and anthraquinone carboxylic acid esters, chlorosulphonated xanthones and thioxanthones and also oxime esters according to German Offenlegungsschrift No. 1,795,089.

The above-mentioned photoinitiators, which may be used in quantities of from 0.2 to 10% by weight and preferably in quantities of from 1 to 5% by weight (based on radiation-hardenable compounds), depending upon the intended purpose of the compositions according to the invention, may be used either individually or—as is frequently of advantage by virtue of synergistic effects—even in combination with one another.

Advantageous additives which can produce a further increase in reactivity are certain tertiary amines such as triethylamine. Additions of phosphines or thioethers are similarly active. The above-mentioned substances are preferably used in quantities of from 0 to 5% by weight, based on the radiation-hardenable compounds.

Like any system capable of vinyl polymerisation, the radiation-hardenable resin compositions necessitate the addition of polymerisation inhibitors in order to obtain high stability in storage. Suitable compounds known to the expert are phenols, for example, hydroquinone, toluhydroquinone, di-tert.-butyl-p-cresol, hydroquinone monomethyl ether and also phenothiazine or copper compounds. The quantity to be added is determined by the required degree of stabilisation and also by the acceptable losses of reactivity which are frequently incurred by the addition of stabilisers. The type and optimum quantity of stabiliser must be determined by concentration tests to be carried out from case to case with varying concentrations of stabiliser. The stabilisers are generally added in quantities of from 0.001 to 0.5% by weight, based on radiation-hardenable compounds.

The radiation-hardenable compositions for which the diluents according to the invention are used preferably contain radiation-polymerisable double bonds.

Radiation-hardenable compositions of this type are, for example, reaction products of at least one polyepoxide containing more than 1,2-epoxide group per molecule and acrylic or methacrylic acid or mixtures thereof, about 0.6 to 1 mole of carboxyl groups having been used to one epoxide group. The polyepoxides may have been pre-extended (polyfunctional compounds) or modified (monofunctional compounds) with ammonia, aliphatic or cycloaliphatic primary or secondary amine, with hydrogen sulphide, aliphatic, cycloaliphatic, aromatic or araliphatic dithiols or polythiols, with dicarboxylic acid and polycarboxylic acids, from 0.01 to 0.6 NH or SH or COOH equivalents having been used to one epoxide equivalent (cf. German Offenlegungsschrifts Nos. 2,349,979 and 2,429,527, German Patent Application No. P 25 33 125.3). The reaction products described above may optionally have been modified with isocyanates.

The radiation-hardenable compositions also include reaction products of ethoxylated alcohols, phenols or amines and acrylic or methacrylic acid.

The radiation-hardenable compositions also include the class of unsaturated polyesters which contain radiation-hardenable unsaturated carboxylic acids, such as maleic acid and fumaric acid, in co-condensed form (cf. German Offenlegungsschrift No. 2,244,171 and No. 2,411,637).

Reaction products of diisocyanates and polysiocyanates with hydroxyalkyl acrylates and methacrylates also belong to this class as do other urethanes containing acrylic and methyacrylic acid units.

However, it is also readily possible to mix the diluents according to the invention with thermoplastic and/or duroplastic (thermosetting) polymers and to subject the resulting mixtures to radiation hardening. The mixing of thermoplastic and/or duroplastic polymers and radiation-hardenable compositions and the diluents according to the invention is also possible.

The diluents according to the invention may be present in the radiation-hardenable mixtures in a proportion of from 5 to 80% by weight and preferably in a proportion of from 10 to 70% by weight based on the total mixture.

The compositions produced with the diluents according to the invention are suitable for use as coating and impregnating compositions for wood, paper, cardboard, plastics, leather, metals, textiles, and also as coatings for ceramic materials. They may also be used as binders for printing inks and as photoresists for the production of screen printing forms and screen printing compositions.

The parts and percentages quoted in the following Examples represent parts and percentages by weight, unless otherwise stated.

Production of the starting materials for Comparison Tests and for the Examples according to the invention (A) Production of ethoxylated trimethylol propane with a degree of ethoxylation of 3.75

1 g of NaOCH$_3$ (sodium methylate) was added to 402 g of trimethylol propane in a flask equipped with a gas inlet pipe, stirrer and thermometer, followed by heating to 100° C. 495 g of ethylene oxide were slowly introduced. On completion of the reaction, the product was briefly evacuated and then cooled. The product obtained was colourless and had an OH-number of 550 and a viscosity of 500 cP at 20° C. (Hoppler viscosimeter).

The product was found by gas chromatography to have the following distribution:
  4% by weight of monoethoxylation product;
  14% by weight of diethoxylation product;
  29% by weight of triethoxylation product;
  30% by weight of tetraethoxylation product;
  16% by weight of pentaethoxylation product; and
  6% by weight of hexaethoxylation product.

(B) Production of the triacrylate of the ethoxylated trimethylol propane obtained in accordance with (A)

300 g of the ethoxylated trimethylol propane with a degree of ethoxylation of 3.75 obtained in accordance with A were azeotropically esterified with 216 g of acrylic acid in 500 ml of toluene in the presence of 2.5 g of p-toluene sulphonic acid and 0.2 g of toluhydroquinone until no more water could be isolated. On completion of the reaction, the mixture was neutralised with an equivalent quantity of Na$_2$CO$_3$, based on p-toluene sulphonic acid, the toluene was distilled off in vacuo (final pressure 1 Torr, final temperature of the reaction mixture 100° C.) and the product was filtered, giving a pale yellow odourless liquid having a viscosity of 102 cP (20° C., Hoppler viscosimeter), a refractive index $n_D^{20}$ of 1.4738, an OH-number of 13 and an acid number of 0.8. The product was used as a diluent according to the invention.

(C) Production of the triacrylate of an ethoxylated trimethylol propane with a degree of ethoxylation of 6

An ethoxylated trimethylol propane with a degree of ethoxylation of 6, produced in accordance with A, had the following distribution:
  3% by weight of product with a degree of ethoxylation of 4

14% by weight of product with a degree of ethoxylation of 5

27% by weight of product with a degree of ethoxylation of 6

27% by weight of product with a degree of ethoxylation of 7

18% by weight of product with a degree of ethoxylation of 8

10% by weight of product with a degree of ethoxylation of 9.

The product was colourless and had an OH-number of 420 and a viscosity of 360 cP at 20° C. in a Hoppler viscosimeter.

400 g of the ethoxylated trimethylol propane with a degree of ethoxylation of 6 were azeotropically esterified with 214 g of acrylic acid in accordance with procedure B. Working up gave a pale yellow odourless oil having a viscosity of 260 cP, as measured at 20° C. in a Hoppler viscosimeter, and a refractive index $n_D^{20}$ of 1.4740. According to U.S. Pat. No. 3,380,831 triacrylates such as these are used as the lowest members (degree of ethoxylation=6) for admixture with macromolecular organic polymer binders.

(D) Production of the triacrylate of an ethoxylated trimethylol propane having a degree of ethoxylation of 12

An ethoxylated trimethylol propane with a degree of ethoxylation of 12 produced in accordance with A had the following distribution:

6% by weight of product with a degree of ethoxylation of 8;

10% by weight of product with a degree of ethoxylation of 9;

19% by weight of product with a degree of ethoxylation of 10;

20% by weight of product with a degree of ethoxylation of 11;

21% by weight of product with a degree of ethoxylation of 12;

14% by weight of product with a degree of ethoxylation of 13; and

8% by weight of product with a degree of ethoxylation of 14.

670 g of the ethoxylated trimethylol propane having a degree of ethoxylation of 12 were azeotropically esterified with 214 g of acrylic acid in the presence of 700 ml of toluene in accordance with procedure B. A pale yellow odourless oil was obtained, having a viscosity of 360 cP (20° C., Hoppler viscosimeter), a refractive index $n_D^{20}$ of 1.4740, an OH-number of 20 and an acid number below 1. According to U.S. Pat. No. 3,380,831, triacrylates such as these are mixed with macromolecular polymer binders.

(E) Production of the triacrylate of an ethoxylated trimethylol propane having a degree of ethoxylation of 2

An ethoxylated trimethylol propane having a degree of ethoxylation of 2 produced in accordance with A has the following distribution:

10.0% by weight of trimethylol propane;

26.0% by weight of product with a degree of ethoxylation of 1;

32.0% by weight of product with a degree of ethoxylation of 2;

19.0% by weight of product with a degree of ethoxylation of 3;

9.0% by weight of product with a degree of ethoxylation of 4; and 3.0% by weight of product with a degree of ethoxylation of 5.

222 g of the reaction product described above were azeotropically esterified with 214 g of acrylic acid in accordance with procedure B. A pale yellow odourless oil was obtained, having a viscosity of 330 cP (20° C., Hoppler viscosimeter), a refractive index $n_D^{20}$ of 1.4740, an OH-number of 18 and an acid number below 1. This triacrylate is used for comparison purposes.

(F) Diacrylate of 1,6-hexane diol 1,6-Hexane oil diacrylate produced in accordance with procedure B had a viscosity of 7 cP (20° C., Hoppler viscosimeter) and a refractive index $n_D^{20}$ of 1.4600. It is used for comparison purposes.

(G) Trimethylol propane triacrylate

Trimethylol propane triacrylate was produced in accordance with procedure B and has a viscosity of 240 cP (20° C., Hoppler viscosimeter) and a refractive index $n_D^{20}$ of 1.4778. It is used for comparison purposes.

(H) Production of a radiation-hardenable epoxy acrylate 3800 g of the diglycidyl ether of bisphenol A (epoxy equivalent 190) were heated to 60° C. Following the introduction of 20 g of thioglycol, 1440 g of acrylic acid were slowly added with stirring and stirring was continued at 60° C. until an acid number (AN) of less than one (N/10 NaOH against bromthymol blue) was obtained. A solid resin with a softening point of approximately 45° C. was obtained.

The epoxy acrylate is used as a mixture component with triacrylates of ethoxylated trimethylol propane according to the prior art and also with trimethylol propane triacrylate and hexane diol diacrylate and for the diluents according to the invention.

(J) Production of a composition hardenable by UV-light of a polyester containing co-condensed fumaric acid units and styrene A polyester of 2320 parts by weight of fumaric acid, 451 parts by weight of 1,2-propylene glycol, 1440 parts by weight of diethylene glycol and 940 parts by weight of trimethylol propane diallyl ether and also 430 parts by weight of diethylene glycol monobutyl ether was dissolved to form a 69% solution in styrene and provided with 5 parts by weight of a photoinitiator (benzoin isopropyl ether).

(K) Production of a urethane acrylate hardenable by UV-light 304 g of the reaction product of 222 g (1 mole) of isophorone diisocyanate and 116 g (1 mole) of hydroxyethyl acrylate were reacted with 200 g of a polyester of phthalic acid and ethylene glycol (OH-number 260). Stirring was continued at 60° C. until no more free N=C=O-groups could be detected. A colourless resin solid at room temperature with a softening point of approximately 35° C. was obtained.

(a) 70 g of the urethane acrylate produced in accordance with procedure K were dissolved in 25 g of ethylacetate to form a solution with a viscosity of 25 poises at 20° C. and provided with 3 g of photoinitiator. For results, see Table 3.

(b) 50 g of the diluent according to the invention and 3 g of photoinitiator were added to 50 g of the urethane acrylate produced in accordance with procedure K. For results, see Table 3. The mixture had a viscosity of 25 poises at 25° C.

EXAMPLE 1

(a) 60 g of the epoxy acrylate produced in accordance with procedure H and 40 g of triacrylate of ethoxylated trimethylol propane having a degree of ethoxylation of 3.75, produced in accordance with procedure B, and also 3 g of α-cyanoethyl benzoin ethyl ether (photoinitiator) were mixed at approximately 60° C. and cooled to room temperature. The data relating to the viscosity and reactivity of this mixture are shown in Table 1.

(b) A mixture was produced in the same way as in (a), except that 40 g of epoxyacrylate and 60 g of the triacrylate of ethoxylated trimethylol propane having a degree of ethoxylation of 3.75 were used. The viscosity and reactivity data are shown in Table 1.

COMPARISON 1

The epoxy acrylate produced in accordance with procedure A was used for this comparison and for comparison 2 to 5. The viscosity and reactivity data of all the comparison tests are shown in Table 1. The viscosities of the mixtures of all the Examples and comparison tests were measured at 20° C. in a Hoppler viscosimeter. For determining the reactivities shown in Tables 1 and 3, the mixtures of the comparison tests and Examples were coated onto paper in a layer thickness of 20 μ and irradiated from a distance of 7 cm with a Philips HTQ-5-lamp. The films were then tack-free and solvent-resistant.

Unless otherwise stated, α-cyanoethyl benzoin ethyl ether was always used as the photoinitiator.

(a) UV-hardenable mixture of:
  60 g of epoxy acrylate;
  40 g of the triacrylate of ethoxylated trimethylol propane (degree of ethoxylation 6); and
  3 g of photoiniator
(b) UV-hardenable mixture of:
  40 g of epoxy acrylate;
  60 g of the triacrylate of ethoxylated trimethylol propane (degree of ethoxylation 6); and
  3 g of photoinitiator.

COMPARISON 2

(a) UV-hardenable mixture of:
  60 g of epoxy acrylate;
  40 g of the triacrylate of ethoxylated trimethylol propane (degree of ethoxylation 12); and
  3 g of photoinitiator.
(b) UV-hardenable mixture of:
  40 g of epoxy acrylate;
  60 g of the triacrylate of ethoxylated trimethylol propane (degree of ethoxylation 12); and
  3 g of photoiniator.

COMPARISON 3

(a) UV-hardenable mixture of:
  60 g of epoxy acrylate;
  40 g of the triacrylate of ethoxylated trimethylol propane (degree of ethoxylation 2); and
  3 g of photoinitiator.
(b) UV-hardenable mixture of:
  40 g of epoxy acrylate;
  60 g of the triacrylate of ethoxylated trimethylol propane (degree of ethoxylation 2); and
  3 g of photoinitiator.

COMPARISON 4

(a) UV-hardenable mixture of:
  60 g of epoxy acrylate;
  40 g of hexane diol diacrylate; and
  3 g of photoinitiator.
(b) UV-hardenable mixture of:
  40 g of epoxy acrylate;
  60 g of hexane diol diacrylate; and
  3 g of photoinitiator.

COMPARISON 5

(a) UV-hardenable mixture of:
  60 g of epoxy acrylate;
  40 g of trimethyl propane triacrylate (procedure G); and
  3 g of photoinitiator.
(b) UV-hardenable mixture of:
  40 g of epoxy acrylate;
  60 g of trimethyl propane triacrylate (procedure G); and
  3 g of photoinitiator.

TABLE 1

|  | Invention Example 1 | | Comparison 1 | | Comparison 2 | | Comparison 3 | | Comparison 4 | | Comparison 5 | |
| --- | --- | --- | --- | --- | --- | --- | --- | --- | --- | --- | --- | --- |
|  | a | b | a | b | a | b | a | b | a | b | a | b |
| Viscosity (poises*) | 100 | 21 | 100 | 34 | 135 | 33 | 110 | 28 | 119 | 4 | 128 | 35 |
| Reactivity (seconds) | 5 | 6 | 8 | 8 | 8 | 12 | 6 | 8 | 18 | 38 | 8 | 8 |

*as measured in a Hoppler viscosimeter at 20° C.

It is clearly apparent from Table 1 that UV-hardenable mixtures produced with the diluents according to the invention show not only a lower viscosity, but also higher reactivity than prior art mixtures. Although in the case of comparison 4 a distinctly lower viscosity is obtained where 60% of the diluent (hexane diol diacrylate) is used this is accompanied by totally inadequate reactivity.

EXAMPLE 2

90 parts by weight of the radiation-hardenable composition produced in accordance with procedure J, containing a polyester, styrene and photoinitiator, were mixed with 10 parts by weight of the triacrylate of ethoxylated trimethylol propane having a degree of ethoxylation of 3.75 (produced in accordance with procedure B).

Films of the mixture according to Example 2 and of the product obtained in accordance with procedure J were coated in a layer thickness of 500 μ onto a glass plate, gelled for 90 seconds under a superactinic fluorescent lamp (Philips TL-AK) arranged at a distance of 5 cm and then hardened under a high-pressure lamp (Philips HTQ-7). The films then showed high gloss and were resistant to scratching and solvents. For the exposure times and pendulum hardness according to Konig, see Table 2.

Table 2

|  | Exposure time (seconds) | Pendulum hardness according to Konig* (seconds) |
| --- | --- | --- |
| Resin according to procedure J | 20 | 85 |
| Resin according to Example 2 | 12 | 90 |

*according to DIN 53157, May 1971 Edition

The lower the measured value, the softer the film.

The results of Table 2 show that mixtures produced with diluents according to the invention (in accordance with Example 2) are completely hardened after a considerably shorter exposure time.

Table 3 below shows the viscosity and reactivity data of a urethane acrylate produced in accordance with procedure J and a urethane resin mixed with a diluent according to the invention (ratio by weight 50:50). Reactivity is determined in the same way as described in comparison 1.

Table 3

|  | Urethane acrylate according to procedure K (a) and (b) | |
| --- | --- | --- |
|  | (a) comparison | (b) invention |
| Viscosity | 25 poises | 25 poises |

Table 3-continued

|  | Urethane acrylate according to procedure K (a) and (b) | |
| --- | --- | --- |
|  | (a) comparison | (b) invention |
| Reactivity | 12 seconds | 4 seconds |

It can be seen from these results that the diluent according to the invention distinctly improves the reactivity of a resin.

We claim:

1. A radiation-crosslinkable diluent for radiation-hardenable compositions comprising a mixture of triacrylates of a reaction product of trimethylol propane and ethylene oxide with an average degree of ethoxylation of from 2.5 to 4, the ethoxylated trimethylol propane being substantially free from trimethylol propane and having the following distribution:
   4 to 5% by weight of monoethoxylation product;
   14 to 16% by weight of diethylation product;
   20 to 30% by weight of triethoxylation product;
   20 to 30% by weight of tetraethoxylation product;
   16 to 18% by weight of pentaethoxylation product; and
   6 to 8% by weight of hexaethoxylation product.

2. A radiation-crosslinkable diluent as claimed in claim 1 wherein the average degree of ethoxylation is from 3 to 4.

3. A radiation-hardenable composition comprising a binder and a radiation-crosslinkable diluent as claimed in claim 1.

4. A radiation-hardenable composition as claimed in claim 3 wherein the binder contains radiation-polymerisable double bonds.

5. A radiation-hardenable composition as claimed in claim 3 which comprises from 5 to 80% by weight of the diluent based on the composition.

* * * * *